United States Patent
Larsson et al.

(10) Patent No.: US 11,415,956 B2
(45) Date of Patent: Aug. 16, 2022

(54) SYSTEM AND PROCEDURE OF A BEARING ARRANGEMENT

(71) Applicant: Aktiebolaget SKF, Gothenburg (SE)

(72) Inventors: Per-Erik Larsson, Lulea (SE); Fredrik Sundquist, Luleå (SE)

(73) Assignee: Aktiebolaget SKF, Gothenburg (SE)

( * ) Notice: Subject to any disclaimer, the term of this patent is extended or adjusted under 35 U.S.C. 154(b) by 366 days.

(21) Appl. No.: 16/737,061

(22) Filed: Jan. 8, 2020

(65) Prior Publication Data
US 2020/0225628 A1   Jul. 16, 2020

(30) Foreign Application Priority Data
Jan. 16, 2019   (DE) .................. 102019200439.3

(51) Int. Cl.
*G05B 19/048*      (2006.01)
*G06N 5/04*        (2006.01)

(52) U.S. Cl.
CPC ............. *G05B 19/048* (2013.01); *G06N 5/04* (2013.01); *G05B 2219/23399* (2013.01)

(58) Field of Classification Search
CPC ........ G05B 19/048; G05B 2219/23399; G05B 23/0235; G06N 5/04
See application file for complete search history.

(56) References Cited

U.S. PATENT DOCUMENTS

| | | | |
|---|---|---|---|
| 2001/0037685 A1* | 11/2001 | Bode | B22D 11/16 73/579 |
| 2009/0103843 A1* | 4/2009 | Maguire | F16C 41/02 384/420 |
| 2010/0166352 A1* | 7/2010 | Morita | F16C 33/667 384/462 |
| 2015/0247529 A1* | 9/2015 | Klos | F16C 19/522 374/46 |
| 2016/0178122 A1* | 6/2016 | Conley | F16C 33/6607 184/26 |

FOREIGN PATENT DOCUMENTS

GB     2559791 A     8/2018

* cited by examiner

*Primary Examiner* — Kidest Bahta
(74) *Attorney, Agent, or Firm* — Garcia-Zamor Intellectual Property Law; Ruy Garcia-Zamor; Bryan Peckjian

(57) ABSTRACT

A system with at least one control unit and a bearing arrangement that includes at least one sensor unit for measuring a quantity. The system is configured to find out with the help of the at least one sensor unit first values of the quantity in a first time span for a first set of instants of time. The system is further configured to infer second values of the quantity for a second set of instants of time from third values measured via the at least one sensor unit in a second time span. The first set of instants of time is different from the second set of instants of time.

11 Claims, 2 Drawing Sheets

SYSTEM AND PROCEDURE OF A BEARING ARRANGEMENT

CROSS REFERENCE TO RELATED APPLICATIONS

This application claims priority to German patent application no. 102019200439.3, filed on Jan. 16, 2019, the contents 5 of which are fully incorporated herein by reference.

TECHNICAL FIELD OF THE INVENTION

The invention is related to a system having a bearing arrangement that includes a control unit and a sensor unit, which is able to measure a quantity. The invention is more particularly directed to the system having a bearing arrangement that includes a control unit and a sensor unit being able to measure the quantity water content in grease contained in the bearing arrangement.

BACKGROUND OF THE INVENTION

A system is known in which a single average of a set of measuring values is used in order to detect a problem of a bearing. The problem is water ingress. Furthermore, from the patent application GB2559791 a measuring of the level of water contend in grease is known.

SUMMARY OF THE INVENTION

The object of the invention is in particular to provide a system with an increased effectiveness. A system is suggested with at least one control unit and a bearing arrangement, which comprises at least one sensor unit for measuring a quantity, wherein the system is configured to find out with the help of the at least one sensor unit first values of the quantity in a first time span for a first set of instants of time, wherein the system is configured to infer second values of the quantity for a second set of instants of time from third values measured via the at least one sensor unit in a second time span, wherein the first set of instants of time is different from the second set of instants of time.

According to the invention an increased effectiveness can be achieved. In particular water ingress into a bearing stemming from different sources and occurring on different timescales can be detected very efficiently and effectively. In particular the reliability of the detection of water ingress can be increased. Furthermore, both more or less instantaneous water ingress and also slowly accumulated humidity buildup can be detected very effectively. Moreover, the robustness of the bearing arrangement can be increased and quite precise information about a point of time of water ingress is obtained. In particular it is easier to find the root cause of water ingress.

BRIEF DESCRIPTION OF THE DRAWINGS

Further advantages result from the following drawing description. The drawing shows an example of the invention. The drawing, the description and the claims contain numerous features in combination. The person skilled in the art will also consider the features individually and summarize them to meaningful further combinations.

DETAILED DESCRIPTION OF THE INVENTION

Figure 1:
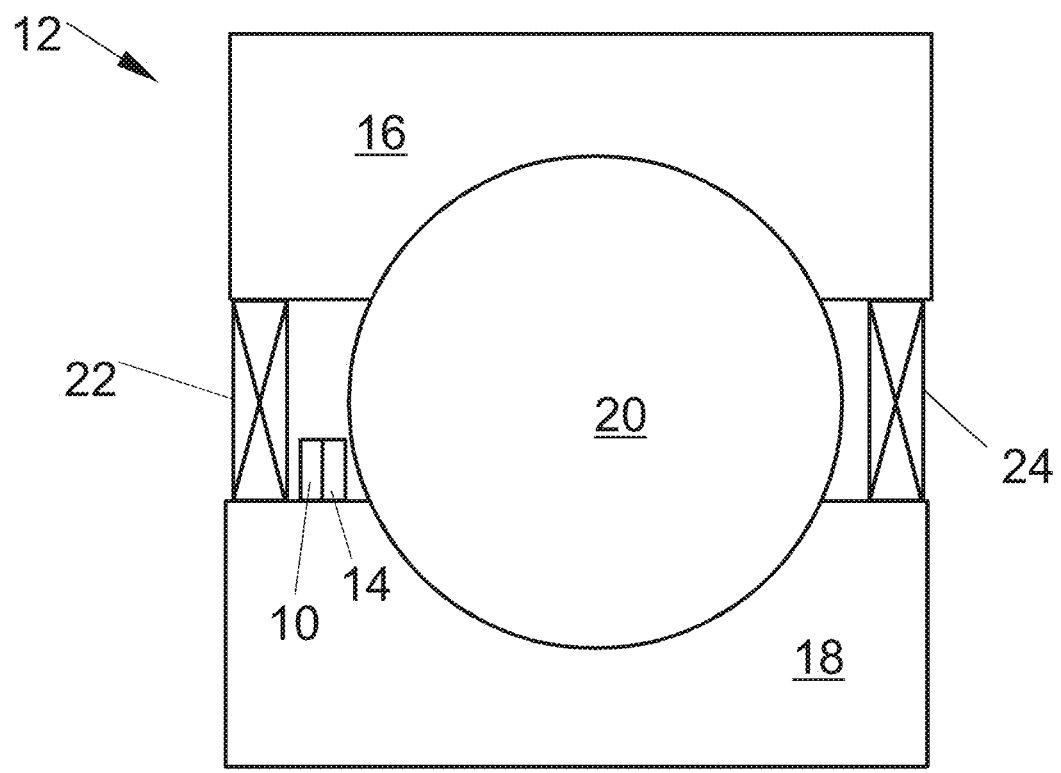
FIG. 1 shows a schematic section through a system according to the invention.

FIG. 1 shows a schematic section through a system according to the invention. The system is given by bearing arrangement 12 which comprises a control unit 10 and a sensor unit 14 which is able to measure a quantity. The quantity is the level of water content in grease contained in the bearing arrangement. The bearing arrangement has an outer ring 16, an inner ring 18 and rolling elements 20 which touch the outer ring and the inner ring. Furthermore, sealings 22, 24 seal the space between the inner ring and the outer ring in which the rolling elements are located. The grease is provided in the bearing arrangement in order to facilitate the movement of the rolling elements relative to the outer ring and the inner ring. In the shown embodiment the rolling elements are balls.

The control unit 10 is configured to measure with the help of the sensor unit first values of the quantity during a first time span for a first set of instants of time. The time span is given by an operating duration of the bearing arrangement. Moreover, the control unit is configured to measure with the help of the sensor unit third values of the quantity in a second time span for a third set of instants of time. The first time span and the second time span are identical. In other embodiments of the invention they can be different. Adjacent instants of time of the first set of instants of time are spaced apart one second. In other words the control unit initiates the measuring in order to get the first values each second. The third set of instants of time is identical to the first set of instants of time. Because of this the third values and the first values are identical.

The control unit is configured to infer second values of the quantity for a second set of instants of time from the third values measured via the sensor unit in the second time span. Adjacent instants of time of the second set of instants of time are spaced apart one hour. For each instant of time of the second set of instants of time the control unit gets one of the second values of the quantity by calculating the mean value of the third values of the quantity which were measured in the hour preceding this respective instant of time of the second set of instants of time. In other embodiments of the invention the calculation of the mean value is substituted by finding out the median or by applying another statistical metric.

In alternative embodiments of the invention adjacent instants of time of the second set of instants of time are spaced apart other amounts of time than one hour.

The control unit is configured to extract a first trend information from the first set and the first values. Moreover, the control unit is configured to extract a second trend information from the second set and the second values. The first trend information is a first trend value and the control unit is configured to emit a signal when the first trend value exceeds a first threshold value and the second trend information is a second trend value and the system is configured to emit a signal when the second trend value exceeds a second threshold value. The emitted signals can be sent from the control unit via radio telecommunication to an alarm unit which displays or rings an alarm in order to indicate that there is a problem with the bearing arrangement. The first trend information is an average of the first values and the second trend information is an average of the second values which lie of course in the past with respect to the evaluating point of time when the second trend information is evaluated. Of course in other embodiments of the invention the trend information can also be different quantities, for example a $1^{st}$ derivative of an interpolation curve. In an alternative embodiment of the invention the control unit can be configured in a way that the second trend information is evaluated at very different points of time and that at each of these points of time the last instant of the second set of instants of time is taken to be the respective point of time at which the second trend information is evaluated. The last aspect might imply that all the second values have to be calculated newly which means that the second trend information is a kind of moving average in this case.

The control unit and the sensor unit can receive their energy from battery or also by energy harvesting.

In other embodiments of a system according to the invention the control unit can be located outside from the bearing arrangement. Then the communication between the control unit and the sensor unit can be done with radio telecommunication.

By using a first and a second trend information it is avoided to use only a single average in order to detect water ingress which is either too fast or too noisy in order to initiate a reliable alarm or too slow to detect small events of water ingress.

The second, slower trend is configured to have far lower alarm level compared to the first, quicker trend because it is more reliable. Generally the short trend shows the time when newly injected water was detected by the sensor unit and the long trend shows the amount of water after being mixed with the grease.

Instead of the level of water content in the grease also the humidity in the bearing arrangement can be taken as the quantity. By separating the measurement in slow and quick trend it is possible to detect free water particles before they are mixed with the grease.

It is also possible to use instead of one time span more time spans for additional alarm response times.

Figure 2:
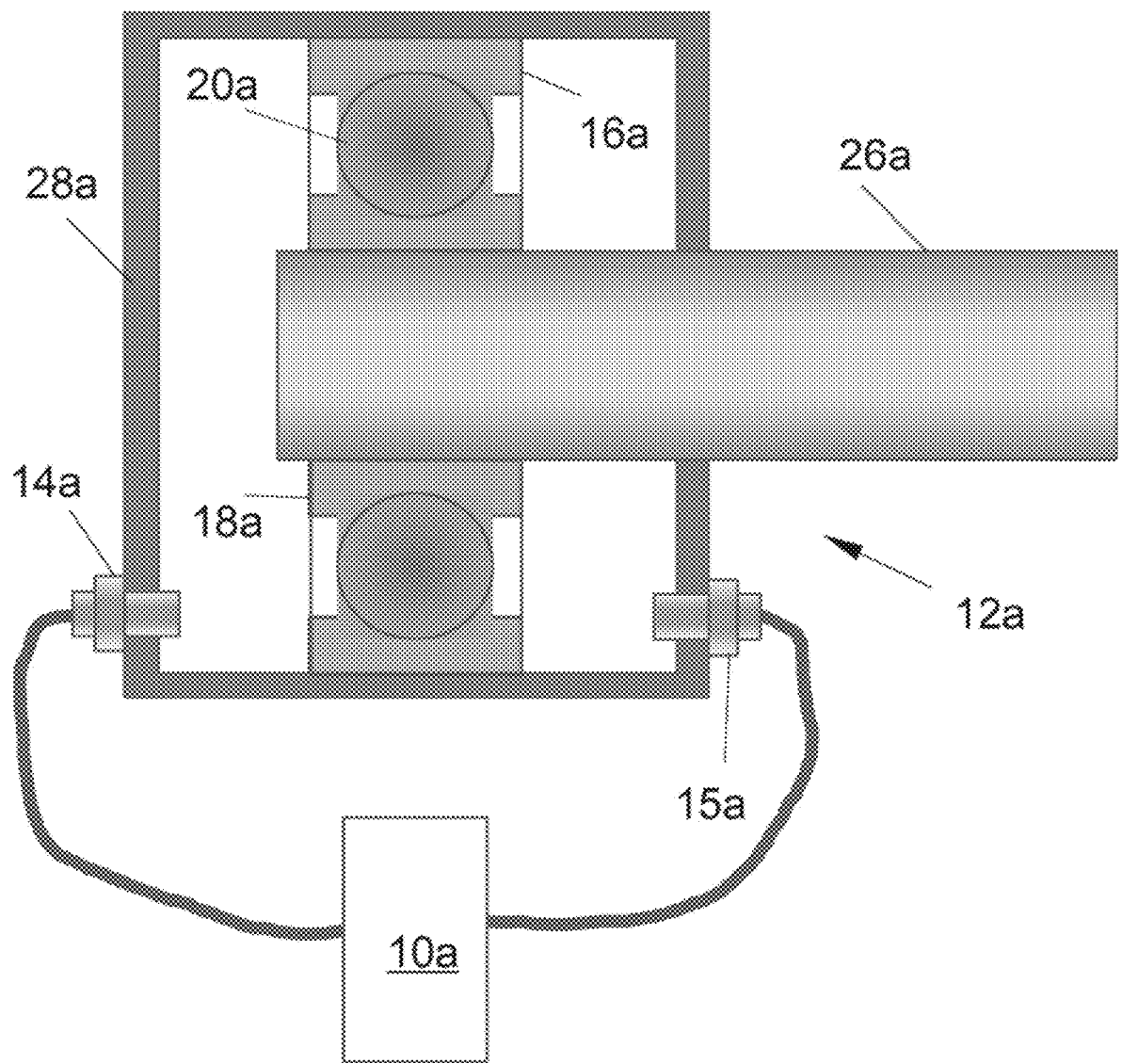
FIG. 2 illustrates a schematic section through a further system according to the invention, wherein sensor units are placed outside of a bearing

FIG. 2 shows an alternative embodiment. Components, features and functions that essentially remain the same are always numbered with the same reference signs. However, to distinguish between the embodiment, the letter "a" is added to the reference signs of the embodiment in FIG. 2. The following description is essentially limited to the differences to the embodiment in FIG. 1, whereby reference can be made to the description of the embodiment in FIG. 1 with regard to components, features and functions that remain the same.

FIG. 2 shows a further embodiment according to the invention. A bearing arrangement of the system comprises a housing 28a at which an outer ring 16a is fixed. An inner ring 18a is fixed at a shaft 26a of the bearing arrangement. The inner ring and the outer ring are part of a bearing of the bearing arrangement. A first sensor unit 14a and a second sensor unit 15a are fixed at the housing. A control unit 10a of the system can use the first sensor unit and/or the second sensor unit to measure a humidity or the level of water content of grease of the bearing. In an alternative embodiment the sensor unit 15a is not present. In a further alternative embodiment the sensor unit 14a is not present.

The invention claimed is:

1. A system with a control unit and a bearing arrangement, the system comprising:
    an inner ring;
    an outer ring which in combination with the inner ring defines a chamber;
    a plurality of rolling elements located in the chamber between the inner ring and the outer ring;
    a seal disposed between the inner ring and the outer ring;
    a grease located in the chamber;
    the control unit being disposed on the inner ring and being axially located between the seal and the plurality of rolling elements;
    a sensor unit for measuring a quantity of water in the grease in the chamber, wherein the sensor unit is located adjacent to the control unit;
    the sensor unit communicating to the control unit the quantity of water in the grease in the chamber such that the control unit is configured to correlate a plurality of first values of the quantity of water in the grease in the chamber taken at a first set of instants of time within a first time span;
    the control unit is configured to calculate a plurality of second values of the quantity of water in the grease in the chamber as calculated for each of the first set of instants of time within the first time span, each of the plurality of second values being the average of the quantity of the water in the grease in the chamber for a predetermined preceding amount of time wherein the control unit automatically extracts a first trend information from the plurality of first values.

2. The system of claim 1, wherein the control unit automatically extracts a second trend information from the plurality of second values.

3. The system of claim 1, wherein the first trend information is a first trend value and the control unit is configured to emit a signal when the first trend value exceeds a first threshold value.

4. The system of claim 2, wherein the first trend information is a first trend value and the control unit is configured to emit a signal when the first trend value exceeds a first threshold value, the second trend information is a second trend value and the control unit is configured to emit a second signal when the second trend value exceeds a second threshold value.

5. The system of claim 1, wherein the second trend information is an average of the plurality of second values, wherein the a predetermined preceding amount of time is one hour.

6. The system of claim 1, wherein each of the plurality of second values is taken at a separate one of a second set of instants of time within the predetermined preceding amount of time, the second set of instants of time are spaced apart between one and one thousand hours and the first set of instants of time are spaced apart between one second and ten minutes.

7. The system of claim 1, wherein the sensor unit can also collect data that is provided to the control unit to determine the humidity contained in the bearing arrangement.

8. The system of claim 1, wherein the first set of instants of time are spaced apart by one second.

9. The system of claim 1, wherein the predetermined preceding amount of time is one hour.

10. The system of claim 1, wherein the sensor unit is configured to also measure the humidity contained in the bearing arrangement.

11. A procedure, executed by a system having a control unit and a bearing arrangement, the system comprising:
    an inner ring;
    an outer ring which in combination with the inner ring defines a chamber;
    a plurality of rolling elements located in the chamber between the inner ring and the outer ring;

a seal disposed between the inner ring and the outer ring;
a grease located in the chamber;
the control unit being disposed on the inner ring and being axially located between the seal and the plurality of rolling elements;
a sensor unit for measuring a quantity of water located in the grease in the chamber, wherein the sensor unit is located adjacent to the control unit;
the sensor unit communicating to the control unit the quantity of water in the grease in the chamber to the control unit such that the control unit is configured to correlate a plurality of first values of the quantity of water in the grease in the chamber taken at a first set of instants of time within a first time span;
the control unit is configured to calculate a plurality of second values of the quantity of water in the grease in the chamber as calculated for each of the first set of instants of time within the first time span, each of the plurality of second values being the average of the quantity of the water present in the grease in the chamber for a predetermined preceding amount of time;
the control unit automatically extracts a first trend information from the plurality of first values, wherein the first trend information is the first trend value and the control unit is configured to emit a signal when the first trend value exceeds a first threshold value;
the control unit automatically extracts the second trend information from the plurality of second values, wherein the second trend information is a second trend value and the control unit is configured to emit a second signal when the second trend value exceeds a second threshold value.

* * * * *